July 31, 1945.    O. W. PACKER    2,380,867
SHAFT ALIGNING APPARATUS
Filed Feb. 5, 1944

Inventor
Oscar W. Packer
by Roberts, Cushman & Woodberry
Attys.

Patented July 31, 1945

2,380,867

UNITED STATES PATENT OFFICE 2,380,867

SHAFT ALIGNING APPARATUS

Oscar W. Packer, Reading, Mass., assignor to The Sanborn Company, Cambridge, Mass., a corporation of Massachusetts Application February 5, 1944, Serial No. 521,279

4 Claims. (Cl. 308—62)

In many kinds of apparatus it is desirable to produce lateral adjustment of two aligned shafts or other rotors while keeping them in alignment. One such example is found in polar coordinate oscilloscopes of the type disclosed in my copending application Serial No. 519,249, filed January 21, 1944, where two shafts are interconnected by a train of gearing, one of the shafts being interconnected with an aligned motor through a flexible coupling and the other shaft being interconnected with an aligned generator through a flexible coupling. In order to reduce back-lash to a minimum it is desirable to adjust the shafts of each pair of gears toward each other, and at the same time it is necessary to keep said two shafts in alignment with the motor and generator respectively.

Objects of the present invention are to provide apparatus for effecting this adjustment which is simple and economical to produce and which is convenient and reliable in use.

In one aspect the present invention involves apparatus comprising a casing wall or other support, a shaft journaled in the support, a rotor casing, such as a motor or generator casing, detachably mounted on one face of the support, a rotor carried by the casing in axial alignment with the aforesaid shaft, a sleeve or other mounting unit for journaling the shaft and aligning it with the rotor, the unit having cylindrical surfaces cooperating with the support, shaft and casing respectively, the surfaces cooperating with the shaft and casing being concentric with each other and the surface cooperating with the support being eccentric relatively to the other two surfaces, whereby rotation of the unit on the support shifts the shaft and casing laterally without altering the alignment of the shaft with the rotor.

In a more specific aspect the apparatus comprises a supporting wall having openings therethrough, in combination with shafts journaled in the openings respectively, a plurality of rotor casings detachably mounted on one face of the wall in line with the respective openings, rotors in the casings connected with the shafts, gearing interconnected with the shafts on the other side of the wall, and mounting units for journaling the shafts in the openings, each unit having cylindrical surfaces cooperating with the aforesaid wall and one of the shafts and one of the casings, the surfaces cooperating with the shaft and casing of each unit being concentric with each other and the surface cooperating with the wall being eccentric relatively to the other two surfaces, whereby back-lash between the intermeshing gears may be taken up successively, without altering the alignment of the shafts with the surfaces cooperating with the casings, by successively rotating the aforesaid units.

For the purpose of illustration a typical embodiment of the invention is shown in the accompanying drawing in which Fig. 1 is an end view of parts of an oscilloscope, corresponding to Fig. 5 of the aforesaid application;

Figure 1:
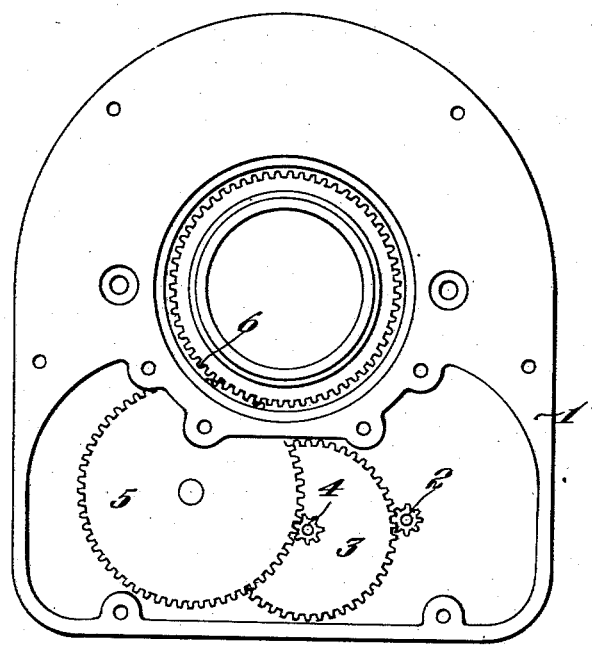

As more fully disclosed in the aforesaid application the particular embodiment chosen for the purpose of illustration comprises a casting 1 carrying a train of gears 2, 3, 4, 5 and 6. The gears 2 to 5 inclusive are mounted on shafts 7, 8 and 9 respectively. Shaft 7 is interconnected with the rotor 11' of a motor 11 through a flexible coupling 12 and the shaft 9 is interconnected with the rotor 13' of a generator 13 through a flexible coupling 14. The generator 13 is mounted on the casting 1 through the medium of a cylindrical casing 16, one end of the casing being open and the other end being closed with a wall 17 except for a circular opening 18 coaxial with the casing. The motor 11 is similarly mounted on the casting 1 through the medium of a cylindrical casing 18. The casings 16 and 18 are attached to the casting 1 by means of screws 15 extending through openings 15' in the casings which are larger than the screws so as to afford some lost motion when the screws are loosened.

Figure 4:
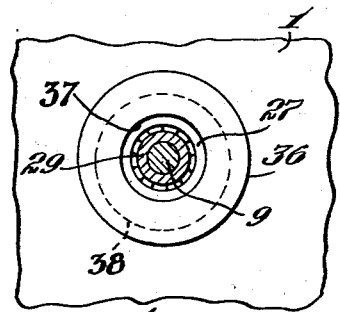
Fig. 4 is a section on line 4—4 of Fig. 3.
Figure 3:
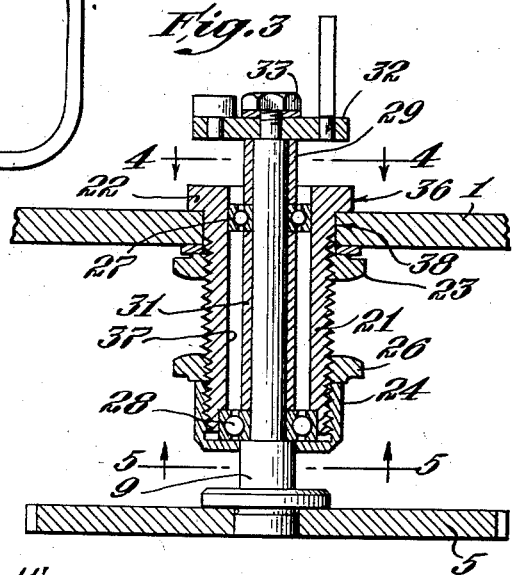
Fig. 3 is a section on line 3—3 of Fig. 2.
Figure 2:
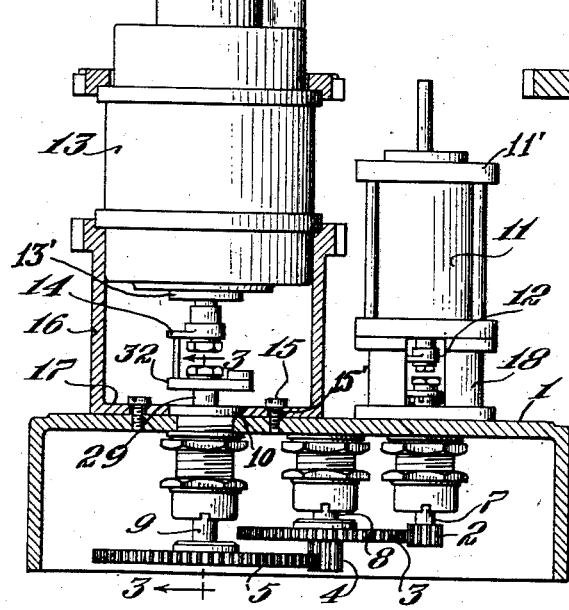
Fig. 2 is a horizontal section through the parts shown in Fig. 1.
Figure 5:
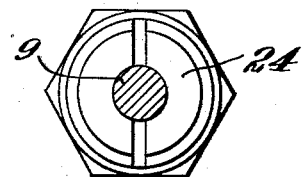
Fig. 5 is a section on line 5—5 of Fig. 3.

Each of the shafts 7, 8 and 9 is journaled in the casing 1 by means such as shown in Figs. 3, 4 and 5. This means comprises a sleeve 21 extending through an opening in the casing 1 with a flange 22 seating on the outside of the casing. The outer periphery of the sleeve is threaded and it is held in the opening by means of a nut 23. Threaded over the inner end of the sleeve 21 is a cap nut 24. A lock nut 26 holds the cap nut 24 in place. The shaft 9 is journaled in the sleeve 21 through the medium of ball bearings 27 and 28 held in spaced relation by sleeves 29 and 31. The outer ring of the ball bearing 28 seats against a shoulder in sleeve 21 and is held in place by cap nut 24, and the inner ring seats against a shoulder on the shaft 9. The parts are held in position by a disc 32 and a nut 33 threaded on the end of the shaft 9. The disc 32 carries a part of the flexible coupling cooperating with a part carried by the rotor 13. The end 17 of the casing 16 fits snugly around the flange 22 of the sleeve 21.

According to this invention the outer periphery 36 of the flange 22, which engages the end opening in the casing 16, is concentric with the inner periphery 37 of the sleeve 21, which supports the shaft 9, but the cylindrical surface 38 of the sleeve, which engages the casting 1, is eccentric with respect to the surfaces 36 and 37. Thus, when screws 15 and nut 23 are loosened the sleeve may be rotated to shift the shaft 9, casing 16 and generator 13 laterally while maintaining them in axial alignment at all times.

With each of the three shafts 7, 8 and 9 journaled in like manner and with the casing 18 fitting over the end of the sleeve for shaft 7 in the same way that the casing 16 fits over the flange 22, the gears may be adjusted for minimum backlash in any desired order as for example by first adjusting shaft 9 to take up the back-lash between gears 5 and 6, then tightening the screws 15 of casing 16 and nut 23, then adjusting shaft 8 to take up the back-lash between gears 4 and 5, and finally adjusting shaft 7 to take up the back-lash between shafts 7 and 8.

I claim:

1. Apparatus of the character referred to comprising a support, a shaft journaled in the support, a rotor casing detachably mounted on one face of the support, a rotor carried by the casing in axial alignment with the shaft, a mounting unit for journaling said shaft and aligning the rotor with the shaft, said unit having cylindrical surfaces interfitting corresponding surfaces on said support, shaft and casing respectively, the surfaces interfitting with the shaft and casing being concentric with each other and the surface interfitting with the support being eccentric relatively to the other two surfaces, whereby rotation of the unit on the support shifts the shaft and casing laterally without altering the alignment of the shaft with the rotor.

2. Apparatus of the character referred to comprising a support having a cylindrical opening therein, a shaft extending through the opening, a rotor casing detachably mounted on one face of the support, the casing having an axial opening, a rotor carried by the casing in alignment with said axial opening, a sleeve for journaling said shaft and aligning the rotor with the shaft, said sleeve having cylindrical surfaces cooperating with said shaft and openings respectively, the surfaces cooperating with said shaft and casing opening being concentric with each other and the surfaces cooperating with the support opening being eccentric relatively to the other two surfaces, whereby rotation of the sleeve on the support shifts the shaft and casing laterally without altering the alignment of the shaft with the rotor.

3. Apparatus of the character referred to comprising a support having a cylindrical opening, a shaft extending through the opening, a rotor casing having a base seating on one face of the support, the base having an axial opening, a rotor carried by the casing in axial alignment with said axial opening, a mounting unit for journaling said shaft and aligning the rotor with the shaft, said unit having a surface fitting said cylindrical opening, said unit also having a cylindrical flange seating on said face and fitting said opening, the cylindrical surface of the flange being concentric with the shaft and the other cylindrical surface being eccentric to the shaft.

4. Apparatus of the character referred to comprising a supporting wall having openings therethrough, shafts journaled in the openings respectively, a plurality of rotor casings detachably mounted on one face of the wall in line with said openings respectively, rotors in said casings connected with said shafts, gearing interconnecting said shafts on the other side of the wall, and mounting units for journaling said shafts in said openings, each unit having cylindrical surfaces interfitting corresponding surfaces on said wall and one of the shafts and one of said casings, the surfaces interfitting with the shaft and casing of each unit being concentric with each other and the surface interfitting with the wall being eccentric relatively to the other two surfaces, whereby back-lash between the intermeshing gears may be taken up successively, without altering the alignment of the shafts with the surfaces interfitting with the casings, by successively rotating said units.

OSCAR W. PACKER.